United States Patent
Fan et al.

(10) Patent No.: US 8,428,416 B2
(45) Date of Patent: Apr. 23, 2013

(54) DEVICE AND METHOD FOR TRANSMITTING LIGHT SIGNALS

(75) Inventors: Shih-Kang Fan, Hsinchu (TW);
Chia-Chi Chien, Keelung (TW);
Yi-Wen Lu, Miaoli County (TW)

(73) Assignee: National Chiao Tung University, Hsinchu (TW)

( * ) Notice: Subject to any disclaimer, the term of this patent is extended or adjusted under 35 U.S.C. 154(b) by 364 days.

(21) Appl. No.: 12/818,382

(22) Filed: Jun. 18, 2010

(65) Prior Publication Data
US 2011/0135266 A1 Jun. 9, 2011

(30) Foreign Application Priority Data
Dec. 8, 2009 (TW) .............................. 98141903 A

(51) Int. Cl.
*G02B 6/10* (2006.01)
(52) U.S. Cl.
USPC ........................................ 385/129; 385/131
(58) Field of Classification Search .................. None
See application file for complete search history.

(56) References Cited

U.S. PATENT DOCUMENTS

| | | | | | |
|---|---|---|---|---|---|
| 4,505,539 | A | * | 3/1985 | Auracher et al. | 385/19 |
| 4,818,052 | A | * | 4/1989 | Le Pesant et al. | 385/17 |
| 6,157,753 | A | * | 12/2000 | Baney et al. | 385/16 |
| 2003/0006140 | A1 | * | 1/2003 | Vacca et al. | 204/547 |
| 2005/0226549 | A1 | * | 10/2005 | Oakey et al. | 385/16 |
| 2006/0083473 | A1 | * | 4/2006 | Ticknor et al. | 385/129 |
| 2008/0166089 | A1 | * | 7/2008 | Klunder et al. | 385/31 |

\* cited by examiner

*Primary Examiner* — Mike Stahl
(74) *Attorney, Agent, or Firm* — Rosenberg, Klein & Lee

(57) ABSTRACT

A device for transmitting light signals includes two electrode plates, a spacing structure, a cladding fluid, and a core fluid. The spacing structure, the cladding and core fluids are disposed between the electrode plates. The refractive index of the core fluid is higher than that of the cladding fluid. The core fluid is located on an electrode of one of the electrode plates, and its shape corresponds to the shape of that electrode. The shape and position is changeable and programmable by the electrodes of one of the electrode plates. The core fluid is further surrounded by the cladding fluid, forming an optical waveguide. Via these arrangements, the interface between the core and cladding fluids is much smoother than that between a fluid and a solid, so that the light signals are less likely to scatter while transmitted, in the core fluid. Therefore, the attenuation and reduction of the intensity of the light signals can be decreased. A method for transmitting light signals is also provided.

19 Claims, 14 Drawing Sheets

(a) (b)

(a) (b)

(a) (b)

DEVICE AND METHOD FOR TRANSMITTING LIGHT SIGNALS

BACKGROUND OF THE INVENTION

1. Field of the Invention

The present invention relates to a device and a method, in particularly, to a device and a method for transmitting light signals.

2. Description of Related Art

At present, microfluidic systems, also called microfluidic chips, are extensively developed. Since microfluidic systems hold the advantages of rapid reaction rate, high sensitivity, high reproducibility, low cost, low pollution, and so on, they are widely used in various applications such as biological, medical, and photoelectric applications.

In photoelectric application, the microfluidic system can be used as a device for transmitting light signals, i.e., an optical waveguide. This kind of microfluidic system usually has a fixed and grooved microchannel as well as a pump for fluid driving in the microchannel. External light signals (light rays) can be coupled into the fluid filled in the microchannel, and then transmitted within the fluid by the total internal reflection.

However, the above-mentioned microfluidic system has the shortcoming of light attenuation. The microchannel is made of solid materials, so its surfaces are inevitably rough and irregular after manufacturing. Therefore, when the light ray hits such surfaces, it would be scattered, i.e., reflected in random directions, reducing the intensity of the light ray. In addition, the fixed microchannels determine the direction of the light ray, which is hardly changeable or programmable during operation. Furthermore, the pump of the microfluidic system is another shortcoming of the microfluidic system, because it increases the overall dimensions and cost of the microfluidic system.

Hence, the inventors of the present invention believe that the shortcomings described above are able to be improved and finally suggest the present invention which is of a reasonable design and is an effective improvement based on deep research and thought.

SUMMARY OF THE INVENTION

In view of the aforementioned issues, the present invention provides a device and a method for transmitting light signals, which eliminates the use of solid walls of the microchannels, forming one or more optical waveguides. As a result, the direction of the light would be altered by the programmable electric-field-driven fluids and the attenuation of the light signals can be reduced.

To achieve the above-mentioned objectives, the present invention provides a device for transmitting light signals comprising a first electrode plate, a second electrode plate, a spacing structure, a cladding fluid, and a core fluid. The first electrode plate comprises a first substrate and a first patterned electrode layer disposed on a surface of the first substrate. The second electrode plate comprises a second substrate and a second electrode layer disposed on a surface of the second substrate which is opposite to the first patterned electrode layer. The spacing structure, cladding fluid, and the core fluid are disposed between the first and the second electrode plates. The core fluid is surrounded by the cladding fluid, and located on an electrode of the first patterned electrode layer. The shape of the core fluid is corresponding to that of the first electrode, and the refractive index of the core fluid is higher than that of the cladding fluid. The core and cladding fluids can be gas, liquid, and suspensions.

To achieve the above-mentioned objectives, the present invention further provides a method for transmitting light signals comprising steps below. A cladding fluid and a core fluid are disposed between a first electrode plate and a second electrode plate, wherein the first electrode plate has a first patterned electrode layer, the second electrode plate has a second electrode layer, the refractive index of the core fluid is higher than that of the cladding fluid. Then, an electric potential is applied to an electrode of the first patterned electrode layer and the second electrode layer, so as to cause the core fluid to change its shape according to the shape of the electrode, the shape-changed core fluid is surrounded by the cladding fluid, Next, light signals are coupled into the shape-changed core fluid.

The present invention provides, at least, efficacies as follow: The shape-changed core fluid surrounded by the cladding fluid can form an optical waveguide, so that light signals (light rays) can be transmitted in the core fluid. In addition, the interface between the core and the cladding fluids is much smoother than that between a fluid and a solid, so that the light signals are less scattered while transmitted in the core fluid. Therefore, the reduction and attenuation of intensity of the light ray can be largely decreased. Furthermore, the shape-changed core fluid can be easily deformed by altering the electric field, making the liquid optical waveguide electrically programmable.

In order to further understand the techniques, means and effects the present invention takes for achieving the prescribed objectives, the following detailed descriptions and appended drawings are hereby referred, such that, and through which, the purposes, features, and aspects of the present invention are able to be thoroughly and concretely appreciated. It is to be understood, however, that the appended drawings are provided solely for reference and illustration, without any intention that they be used for limiting the present invention.

DETAILED DESCRIPTION OF THE PREFERRED EMBODIMENTS

Figure 1:
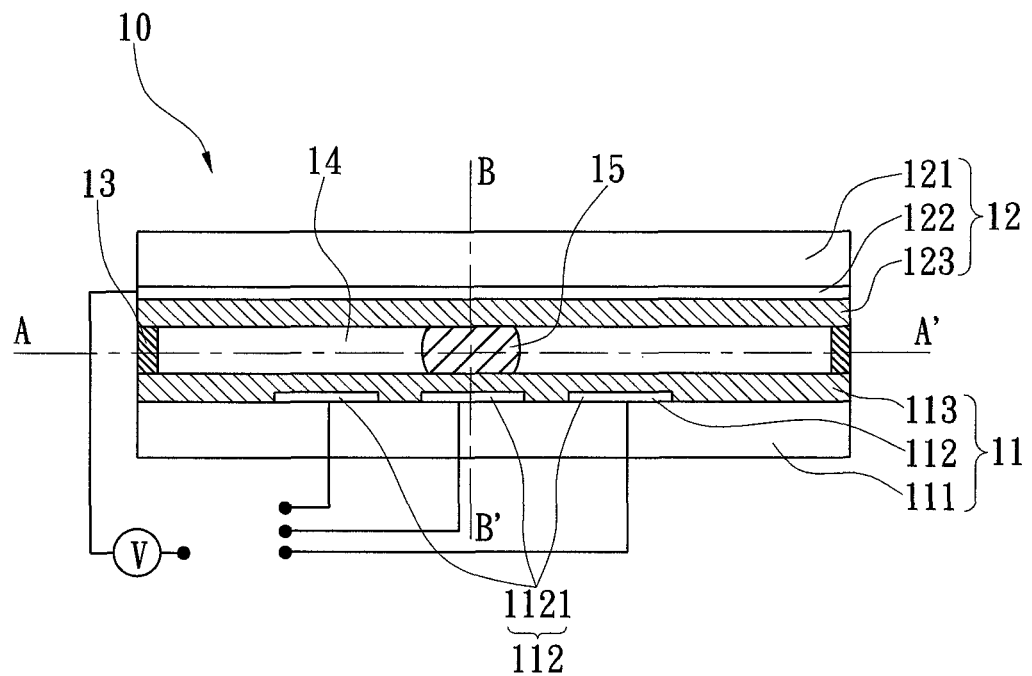
FIG. 1 is a cross-sectional view of a device for transmitting light signals in accordance with a first preferred embodiment of the present invention.
Figure 2:
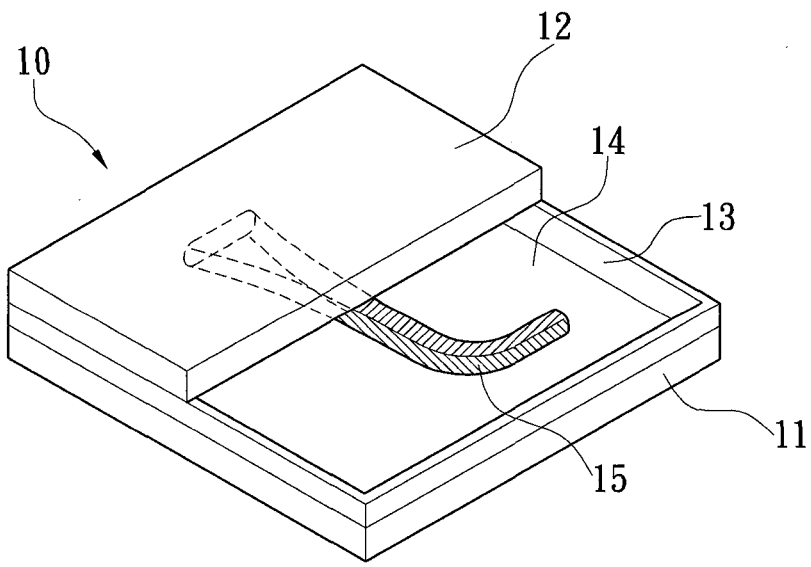
FIG. 2 is a perspective view of the device for transmitting light signals in accordance with the first preferred embodiment of the present invention.

Please refer now to FIGS. 1 and 2, in which a device for transmitting light signals in accordance with a first preferred embodiment of the present invention is disclosed. For conciseness of illustration, the "device for transmitting light signals" is called "device" for short.

The device 10 can be regarded as a microfluidic system (microfluidic chip) without pump and grooved microchannel. Fluids, including gases and liquids, can be accommodated within the device 10, and moved or shape-changed by dielectrophoresis (DEP), electrowetting-on-dielectric (EWOD), or other physical phenomena which are induced by applying an electric potential to the device 10.

The device 10 comprises a first electrode plate 11, a second electrode plate 12, a spacing structure 13, a cladding fluid 14, and a core fluid 15.

The first electrode plate 11 includes a first substrate 111, a first patterned electrode layer 112, and a first hydrophobic layer 113.

The first substrate 111 can be a rectangular plate, made of glass, silicon, poly-dimethylsiloxane (PDMS), polyethylene terephthalate (PET), polyethylene naphthalate (PEN), flexible polymer materials, or insulating materials.

Figure 17:
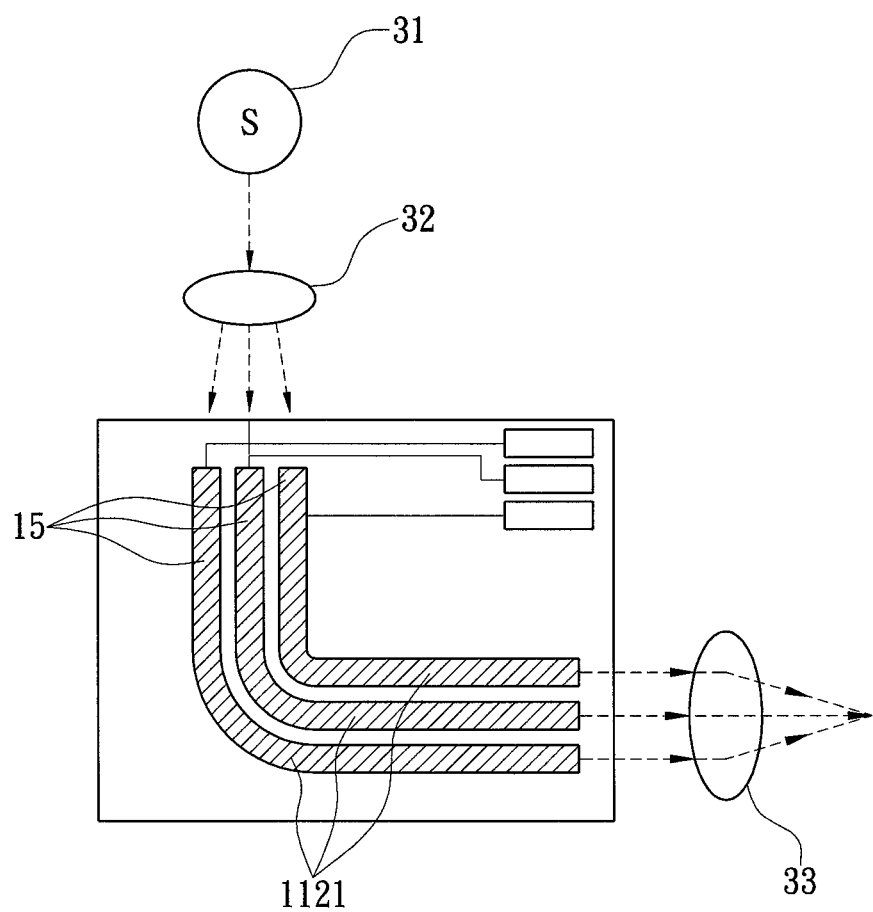
FIG. 17 is a top view of a device for transmitting light signals in accordance with a sixth preferred embodiment of the present invention.

The first patterned electrode layer 112 is disposed on a surface, i.e., top surface, of the first substrate 111. The term "patterned" means that the electrode layer 112 does not simply cover the whole surface of the first substrate 111, but part surface, forming a specific pattern (or picture) on the first substrate 111. As shown in FIG. 1 and FIG. 17, the first patterned electrode layer 112 comprises three substantially "L" shaped and tapered electrodes 1121 and other electrodes. The first patterned electrode layer 112 can be made of conductive materials, conductive polymeric materials or conductive oxides, such as Cr, Cu, metal, PEDOT: PSS (poly (3, 4-ethylenedioxythiophene) polystyrenesulfonate) or Indium Tin Oxide (ITO).

The first hydrophobic layer 113 is disposed on the top of the first patterned electrode layer 112, and covers all over the first patterned electrode layer 112. The first hydrophobic layer 113 can be made of hydrophobic materials, such as Teflon, Cytop, and fluoropolymers; its purpose is to ease the driving of the cladding fluid 14 and core fluid 15. The first hydrophobic layer 113 is also called a low friction layer, because of low coefficient of friction between the fluid and itself.

The second electrode plate 12 is disposed above the first electrode plate 11, and has a second substrate 121, a second electrode layer 122 and a second hydrophobic layer 123.

Similarly, the second substrate 121 can be a rectangular plate, also made of glass, silicon, PDMS, PET, PEN, flexible polymer materials, or insulating materials.

The second electrode layer 122 is disposed on a surface, i.e., bottom surface, of the second substrate 121, and is opposite to the first patterned electrode layer 112. The second electrode layer 122 covers the whole surface of the second substrate 121, and can be made of conductive materials, conductive polymeric materials or conductive oxides, such as Cr, Cu, PEDOT: PSS, metal, or ITO.

It is noteworthy that the second electrode layer 122 may also be a patterned electrode layer like the first patterned electrode layer 112. That means the second electrode layer 122 may has one or more than one specific shaped electrode corresponding to the first patterned electrode layer 112.

The second hydrophobic layer 123 is disposed on the bottom of the second electrode layer 122, and covers all over the second electrode layer 122. The second hydrophobic layer 123, similar to the first hydrophobic layer 113, can be made of hydrophobic materials, such as Teflon, Cytop, and fluoropolymers, for easing the driving of the cladding fluid 14 and core fluid 15, and also called a low friction layer.

It is noteworthy that the first hydrophobic layer 113 and the second hydrophobic layer 123 are not necessary to be set, if the core fluid 15 has sufficient hydrophobic property or surface energy, or the first patterned electrode layer 112 and the second electrode layer 122 are hydrophobic to the fluid.

The spacing structure 13 is disposed between the first and the second electrode plates 11/12 to form a space between the first and the second electrode plates 11/12 for accommodating the core fluid 15 and the cladding fluid 14. The spacing structure 13 may be a continuous frame structure or several separated pillar structures. If the spacing structure 13 is a continuous frame structure, it may have some transparent portions or openings for allowing light signals (light rays) to pass through.

The cladding fluid 14 and the core fluid 15 are disposed between the first and the second electrode plate 11/12; the core fluid 15 is located on the "L" shaped electrode 1121 and surrounded by the cladding fluid 14. The electrode 1121 and the second electrode layer 122 are applied with an electric potential (direct current or alternating current), then the core fluid 15 would be forced to flow on the electrode 1121 and change its shape according to the shape of the electrode 1121 by DEP or EWOD, so that the shape of the core fluid 15 becomes a "L" shaped tube. If the core fluid 15 is manipulated (moved or shaped) by DEP, the dielectric constant of the core fluid 15 may be higher than that of the cladding fluid 14.

The refractive index of the core fluid 15 is higher than that of the cladding fluid 14. The cladding fluid 14 and the core fluid 15 may be gases or liquids; in this embodiment, silicone oil with the refractive index of 1.401 is used as an instance for the cladding fluids 14, and γ-butyrolactone with refractive index of 1.442, is used as an instance for the core fluid 15. On the other hand, the cladding fluids 14 may be mineral oil, aqueous solution, gas, or other fluids with a low refractive index, and the core fluid 15 may be silicone oil, mineral oil, aqueous solution, and other fluids with a high refractive index.

Figure 3:
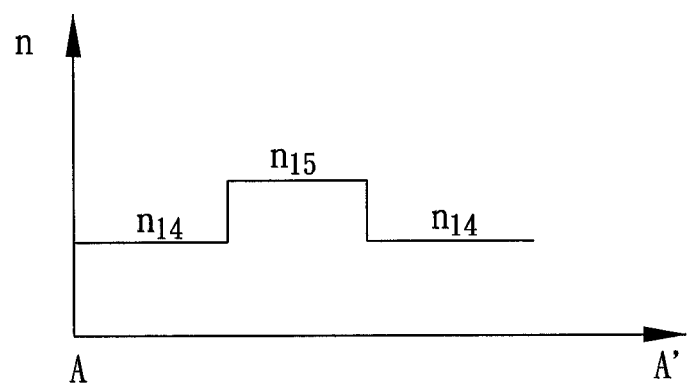
FIG. 3 is a schematic view of the refractive index varying along A-A' direction of FIG. 1.
Figure 4:
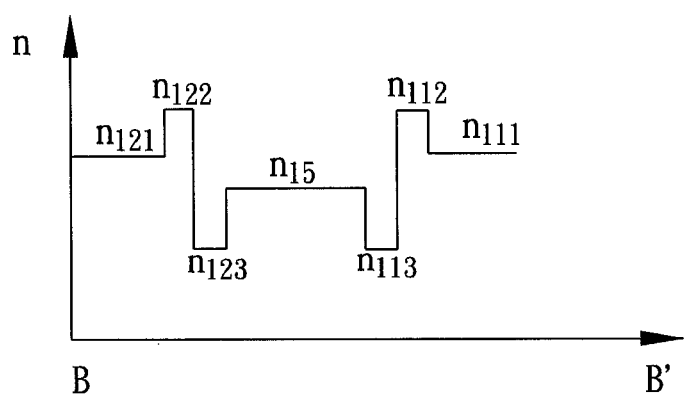
FIG. 4 is a schematic view of the refractive index varying along B-B' direction of FIG. 1.

Please refer to FIGS. 3 and 4, the relative refractive indices across the device 10 are shown. Along horizontal A-A' direction and vertical B-B' direction, the refractive index of the core fluid 15 ($n_{15}$) is higher than those of the cladding fluid 14 ($n_{14}$), first hydrophobic layer 113 ($n_{113}$), and second hydrophobic layer 123 ($n_{123}$), so that a total internal reflection can occur within the core fluid 15 for all directions if the incident angle of the coupled light ray is appropriately adjusted. In other words, an optical waveguide with smooth surfaces is formed by surrounding the core fluid 15 in the cladding fluid 14. When a light ray (light signal) is coupled into the core fluid 15 from one end of the core fluid 15, the light ray would be transmitted toward another end of the core fluid 15 with less intensity reduction and attenuation.

Figure 5:
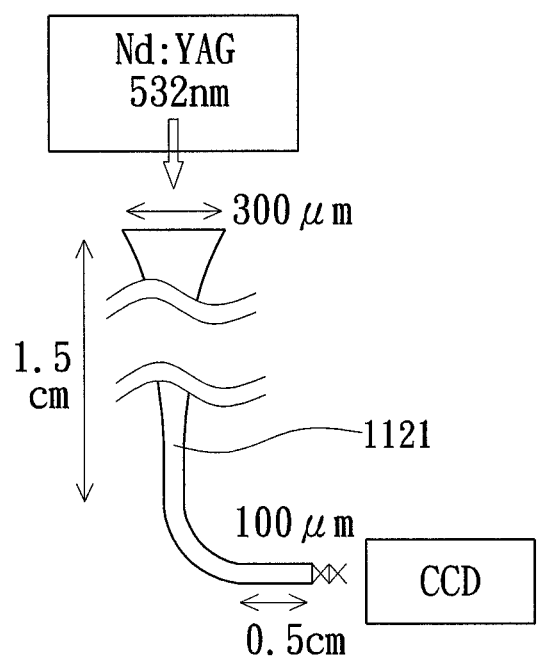
FIG. 5 is a top view of an experimental platform for demonstrating the device in accordance with the first preferred embodiment of the present invention.

Please refer to FIG. 5, more details of the mechanism of light transmission in device 10 are described here and demonstrated with an experimental platform. The platform includes a laser light source (Nd: YAG 532 nm) aiming one end of the core fluid 15 for coupling the light ray into the core fluid 15, observed with image capturing devices (CCD) located at the other end of the core fluid 15 (side view observation) and above the electrode 1121 (top view observation) which is not shown in FIG. 5.

Figure 6:
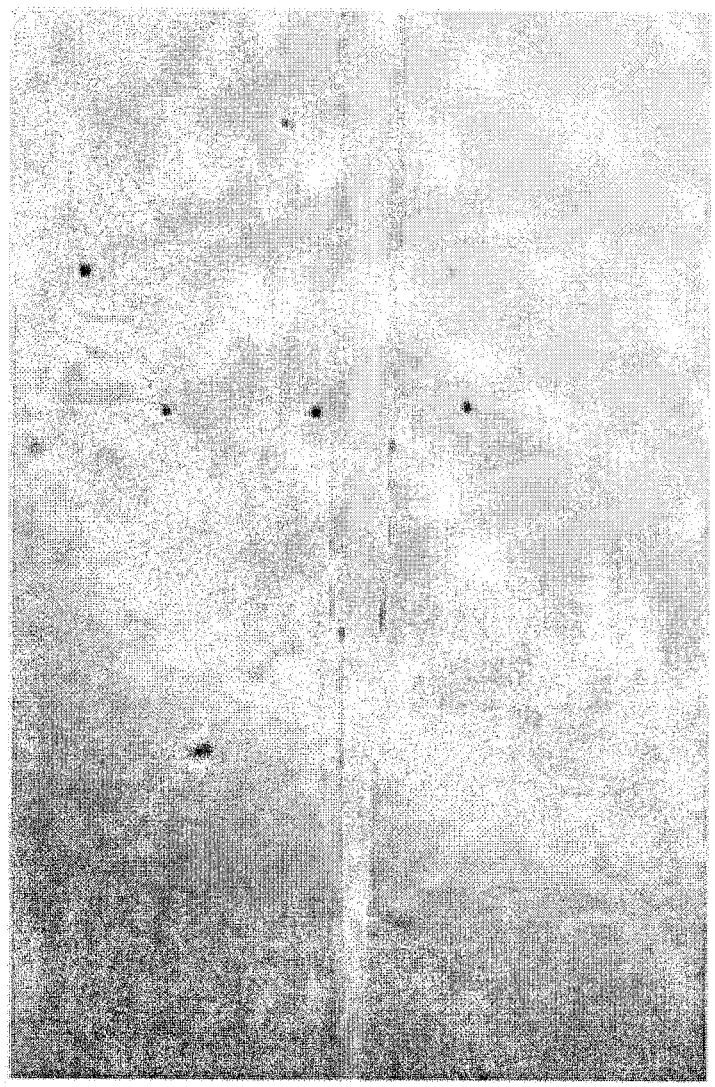
FIG. 6 is a practical photo of the core fluid of the device in accordance with the first preferred embodiment of the present invention.

Please refer to FIG. 6, an electric potential is applied to the electrode 1121 and second electrode layer 122, so that, from the top CCD, it is observed that the core fluid 15 flows on the electrode 1121 and changes its shape to fit the shape of the electrode 1121. Please refer to FIGS. 7 and 8, when a light ray is coupled into one end of the core fluid 15, it would be transmitted toward the other end of the core fluid 15. So, from the top (FIG. 7) and lateral (FIG. 8) CCDs, it is observed that the light ray reaches the other end of the core fluid 15.

Figure 7:
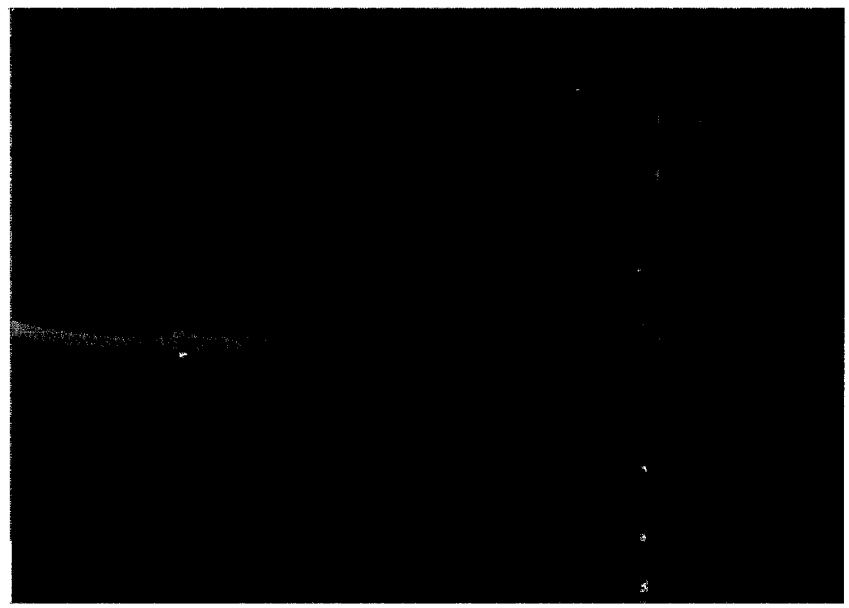
FIG. 7 is a practical top-view photo of the light signals transmitted within the core fluid of the device in accordance with the first preferred embodiment of the present invention.
Figure 8:
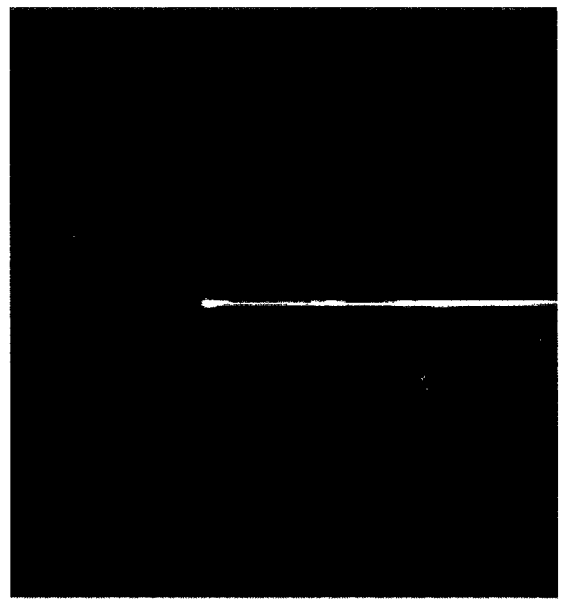
FIG. 8 is another practical side-view photo of the light signals transmitted within the core fluid of the device in accordance with the first preferred embodiment of the present invention.

It is noteworthy that the core fluid 15 is mixed with a rhodamine dye for easing the observation of light transmitting as shown in FIGS. 7 and 8. However, in practical utilizations, it is not necessary to mix the core fluid 15 with the rhodamine dye or other stains.

Figure 9:
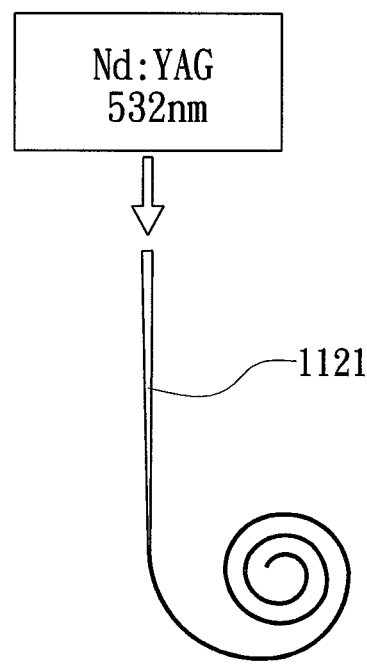
FIG. 9 is a top view of a device for transmitting light signals in accordance with a second preferred embodiment of the present invention.
Figure 10:
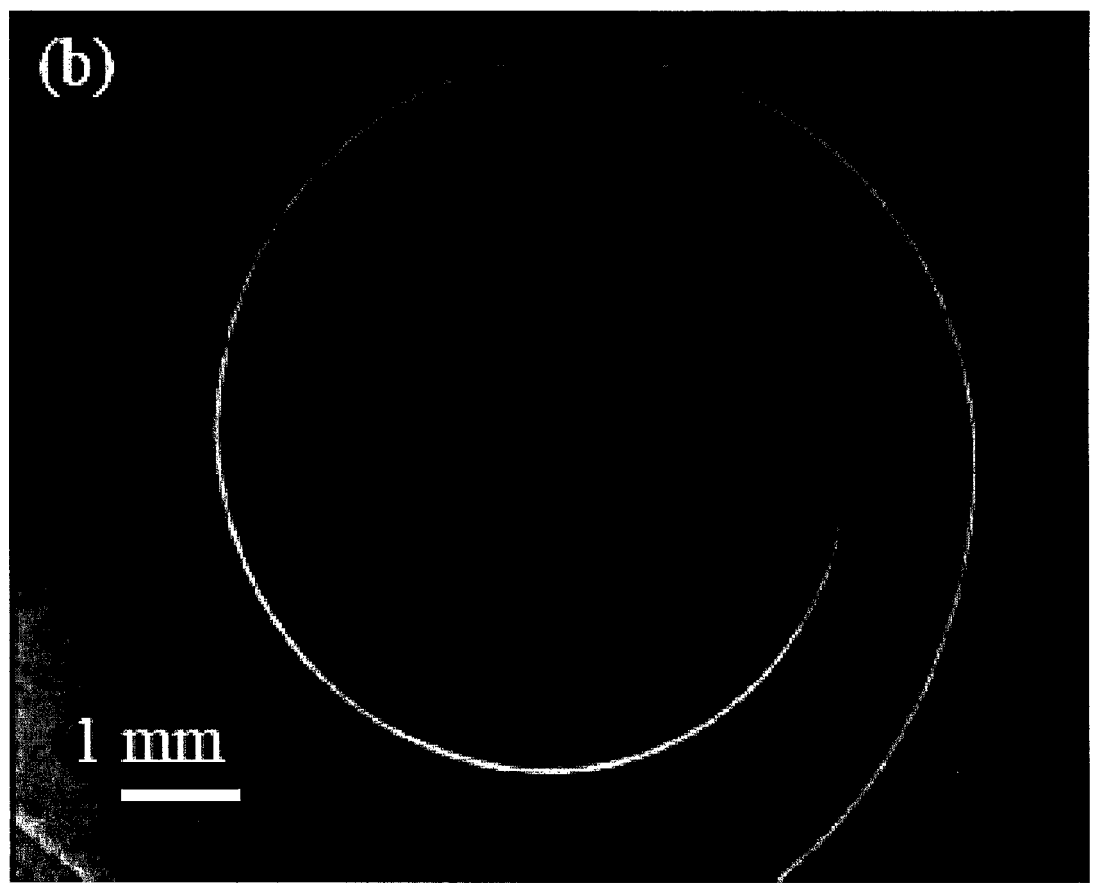
FIG. 10 is a practical top-view photo of the light signals transmitted within the core fluid of the device in accordance with the second preferred embodiment of the present invention.

Please refer to FIG. 9, a second embodiment of the device 10 is disclosed. The first patterned electrode layer 112 comprises a spiral shaped electrode 1121; the core fluid 15 would change its shape to a spiral one to fit the electrode 1121. Please refer to FIG. 10, it is observed that the light ray is transmitted along the spiral-shaped core fluid 15.

Figure 11:
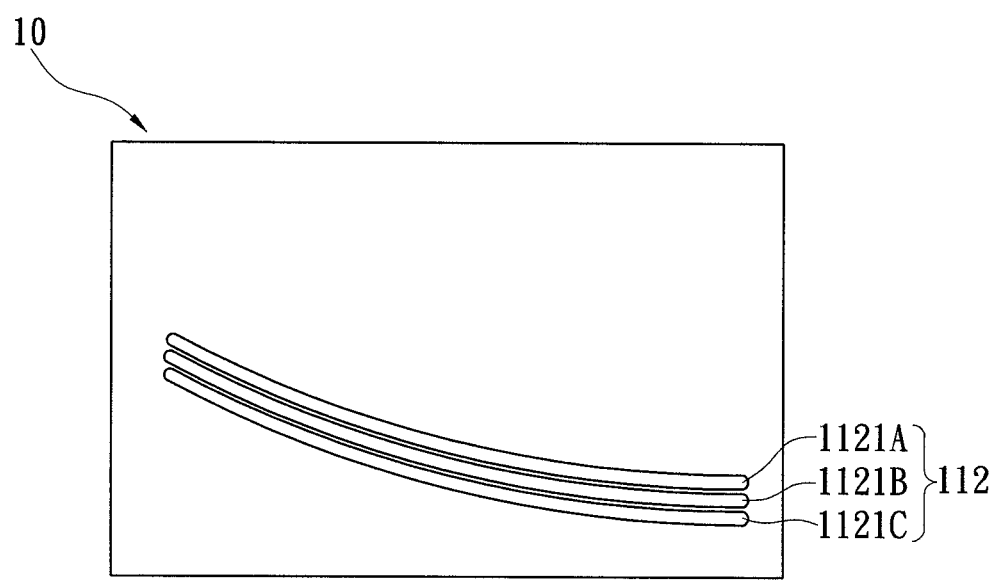
FIG. 11 is a top view of a device for transmitting light signals in accordance with a third preferred embodiment of the present invention.
Figure 12:
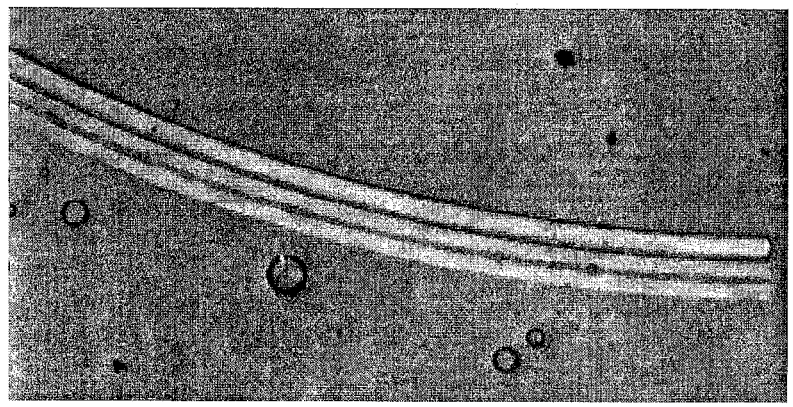
FIGS. 12(a) and 12(b) are practical top-view and side-view photos, respectively, of the light signals transmitted within the core fluid of the device in accordance with the third preferred embodiment of the present invention.
Figure 12:
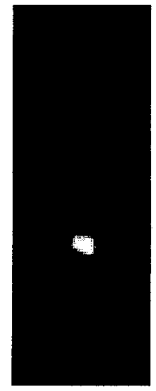
Figure 13:
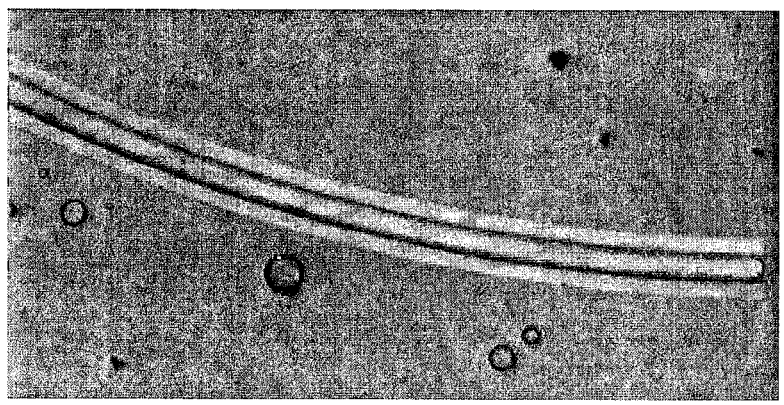
FIGS. 13(a) and 13(b) are another practical top-view and side-view photos, respectively, of the light signals transmitted within the core fluid of the device in accordance with the third preferred embodiment of the present invention.
Figure 13:
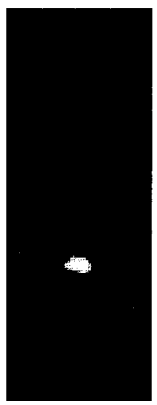
Figure 14:
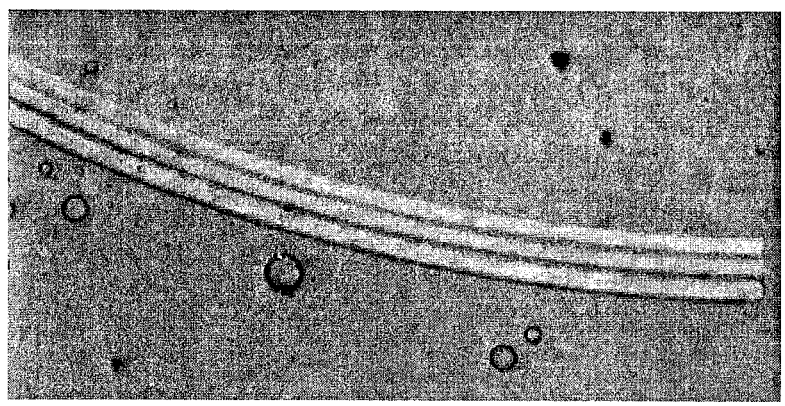
FIGS. 14(a) and 14(b) are further practical top-view and side-view photos, respectively, of the light signals transmitted within the core fluid of the device in accordance with the third preferred embodiment of the present invention.
Figure 14:

Please refer to FIG. 11, a third embodiment of the device 10 is disclosed. The first patterned electrode layer 112 has several separated and curved electrodes 1121A-C parallel to each other. Please refer to the top and side observations of FIGS. 12(a) and 12(b), respectively, an electric potential is applied to the electrode 1121A, and then the core fluid 15 surrounded by the cladding fluid 14 forms an optical waveguide on the electrode 1121A. After that, the light ray can be transmitted within the core fluid 15 and toward the output end (the right end) of the core fluid 15, so one can see a bright point on the output end of the core fluid 15. Please refer to FIGS. 13(a), 13(b), 14(a), and 14(b), when the electric potential is applied to another electrode 1121B or 1121C, the core fluid 15 will shift to that electrode 1121B or 1121C and form a new optical waveguide on that. Then, the light ray will change its transmitting path according to the shifted core fluid 15, so one can see that the bright point on the output end of the core fluid 15 shifts. Therefore, the device 10 with several electrodes 1121 can serve as an optical switch.

Figure 15:
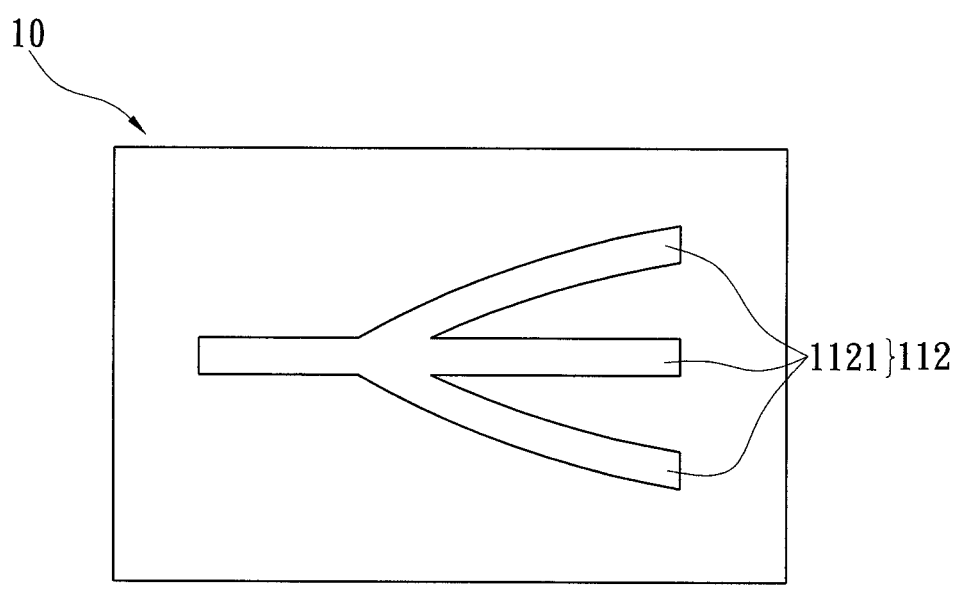
FIG. 15 is a top view of a device for transmitting light signals in accordance with a fourth preferred embodiment of the present invention.

Please refer to FIG. 15, a fourth embodiment of the device 10 is disclosed. Similar to the third embodiment, the first patterned electrode layer 112 also has several electrodes 1121, however, with a common input end (the left end), and separated output ends (the right ends). The core fluid 15 can form an optical waveguide on one of the electrodes 1121. When the electric potential is applied to another one of electrodes 1121, left part of the core fluid 15 remains still, right part of the core fluid 15 shifts, so as to change the transmitting path of the light ray. Therefore, the device 10 of the fourth embodiment also can serve as an optical switch.

Figure 16:
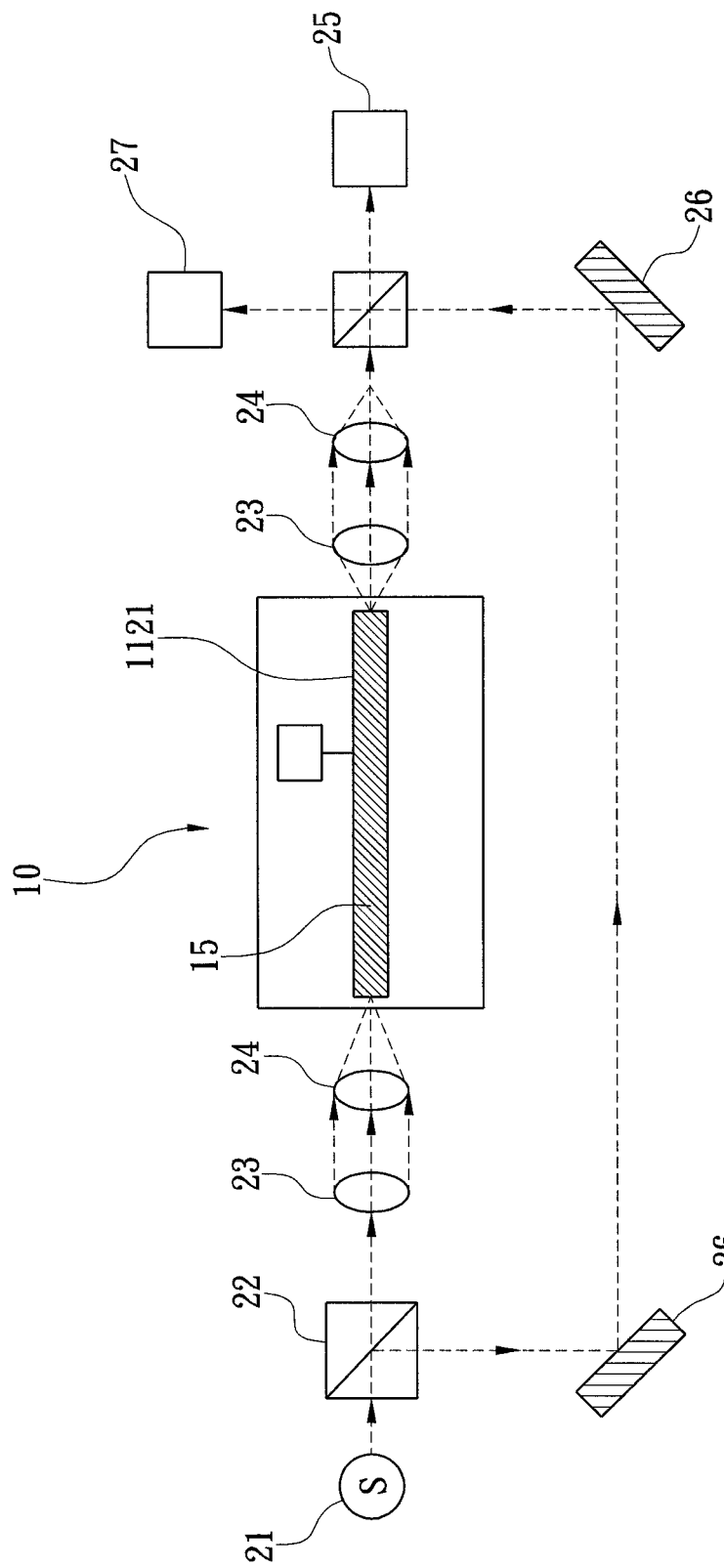
FIG. 16 is a top view of a device for transmitting light signals in accordance with a fifth preferred embodiment of the present invention.

Please refer to FIG. 16, a fifth embodiment of the device 10 is disclosed. The device 10 is disposed in a Mach-Zehnder interferometer, and the first patterned electrode layer 112 of the device 10 has a straight-line shaped electrode 1121. Light ray is emitted into a beam splitter 22 from a light source 21, and divided into two light rays. The upper light ray is transmitted into a collimator 23, concentrated by a lens 24, and coupled into the core fluid 15 on the electrode 1121. After that, the upper light ray is transmitted within the core fluid 15, leaves the core fluid 15, and finally enters the first detector 25. Meanwhile, the lower light ray which is entirely transmitted in air is reflected twice by the mirrors 26 and enters the second detector 27. From the two detectors 25/27, the phase relationship between the upper and lower light rays can be understood. In other words, the phase shift of the light ray passing through the core fluid 15 can be understood.

Please refer to FIG. 17, a sixth embodiment of the device 10 is disclosed. The device 10 is disposed between a first lens 32 and a second lens 33. The first patterned electrode layer 112 of the device 10 has three "L" shaped and curved electrodes 1121. The core fluids 15 are located on their respective electrodes 1121 and change their shapes to fit the electrodes 1121 when electric potentials are applied to the electrodes 1121, forming three optical waveguides. A light source 31 emits a light ray from the focal point of the first lens 32, so the light ray is divided into at least three light rays when passing the first lens 32. Then, the three light rays are respectively coupled into the core fluids 15 and transmitted within the core fluids 15. After that, the light rays leave the core fluids 15 and pass through the second lens 33. The second lens 33 would further concentrate the light ray at its focal point.

Figure 18:
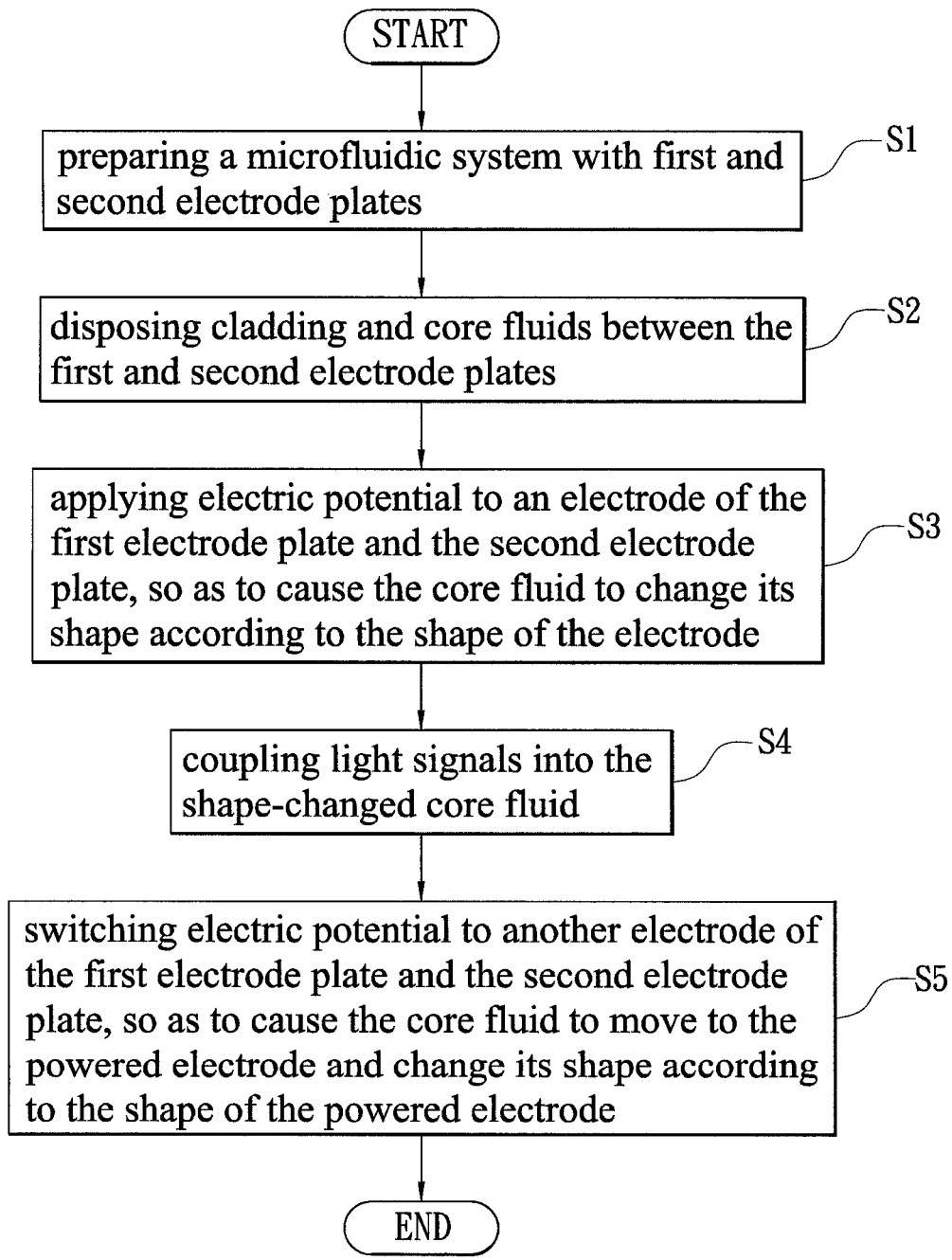
FIG. 18 is a flowchart of a method for transmitting light signals in accordance with a preferred embodiment of the present invention.

Please refer to FIG. 18, what mentioned above is the way that the device 10 transmits the light signals (light rays), and can be described as the following steps. In step S1: the microfluidic system with the first electrode plate 11 and the second electrode plate 12 is prepared first.

In step S2: The cladding fluid 14 and the core fluid 15 are disposed between the first electrode plate 11 and the second electrode plate 12. The core fluid 15 is located on the electrode 1121 and surrounded by the cladding fluid 14.

In step S3: the electric potential is applied to the electrode 1121 and the second electrode layer 122, so as to cause the core fluid 15 to flow on the electrode 1121 and change its shape according to the shape of the electrode 1121. The shape-changed core fluid 15 is still surrounded by the cladding fluid 14, forming an optical waveguide.

In step S4: the light signals (light rays) are coupled into the shape-changed core fluid 15 from one end of the core fluid 15, and transmitted towards another end of the core fluid 15.

If the device 10 serves as an optical switch, there is a further step S5 after S4. In step S5: the electric potential is applied to another electrode 1121 of the first patterned electrode layer 112 and the second electrode layer 122, so as to cause the core fluid 15 to partly or entirely shift to the potential-applied electrode 1121 and change its shape according to the shape of the potential-applied electrode 1121.

The above-mentioned steps can be considered as a method for transmitting light signals according to a preferred embodiment of the invention.

Figure 19:
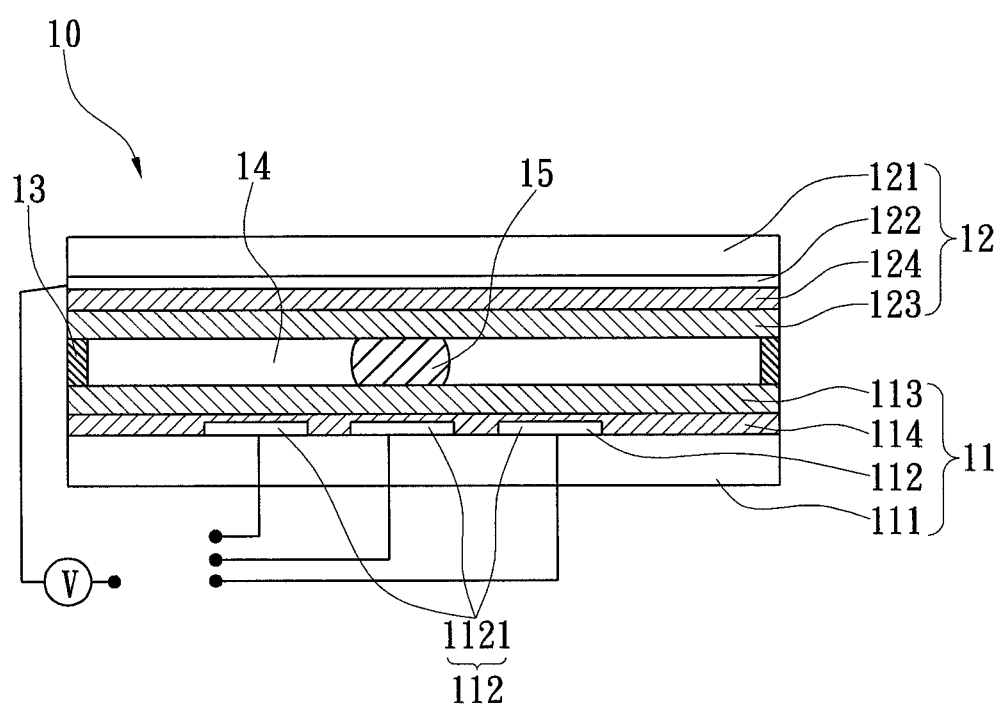
FIG. 19 is a side view of a device for transmitting light signals in accordance with a seventh preferred embodiment of the present invention.

Last but not least, there is a seventh embodiment of the device 10. Please refer to FIG. 19, if the electric properties of the cladding fluid 14 and core fluid 15 do not meet the usage requirements for DEP and EWOD manipulations, a first dielectric layer 114 would be disposed between the first hydrophobic layer 113 and the first patterned electrode layer 112. In addition, a second dielectric layer 124 would be disposed between the second hydrophobic layer 123 and the second electrode layer 122. Therefore, the core fluid 15 can be more readily manipulated by DEP and EWOD phenomena. The first and second dielectric layers 114/124 can be made of Parylene, positive photoresist materials, negative photoresist materials, polymer materials, and insulating materials.

Consequently, the device and the method of the present invention have at least the characteristics as follows:
1. The shape-changed core fluid surrounded by the cladding fluid forms an optical waveguide, so light signals (light rays) can be transmitted in the core fluid.
2. The interface between the core and cladding fluids is much smoother than that between a fluid and a solid, so that the light ray is less likely to scatter while transmitted in the core fluid. Therefore, the attenuation and reduction of the intensity of the light ray can be decreased.
3. The core fluid can quickly change its shape and forms an optical waveguide when electric potential is applied.
4. The positions and shapes of the optical waveguides are changeable and programmable by manipulating the core fluids.
5. After the core fluid forms the optical waveguide, it will stand still, i.e., not flow. Therefore, the interface between the core and cladding fluids is stable.
6. There is no need to refill the core fluid.
7. The core fluid is actuated by applying the electric potential, not by the external pump, saving the cost and volume of the system.
8. Both device and method are readily utilized and realized.

The above-mentioned descriptions represent merely the preferred embodiment of the present invention, without any intention to limit the scope of the present invention. Various equivalent changes, alternations or modifications based on the claims of the present invention are all consequently viewed as being embraced by the scope of the present invention.

What is claimed is:

1. A device for transmitting light signals comprising:
a first electrode plate, comprising a first substrate and a first patterned electrode layer disposed on a surface of the first substrate;
a second electrode plate, comprising a second substrate and a second electrode layer disposed on a surface of the second substrate opposite the first patterned electrode layer;
a spacing structure, disposed between the first electrode plate and the second electrode plate;
a cladding fluid, disposed between the first electrode plate and the second electrode plate; and
a core fluid, disposed between the first electrode plate and the second electrode plate, surrounded by the cladding fluid, and located on an electrode of the first patterned electrode layer, wherein the core fluid has a shape corresponding to the shape of the electrode, and the refractive index of the core fluid is higher than of the cladding fluid; responsive to electrical energization of the electrode the core fluid substantially bisecting the cladding fluid to guide the light signal between the first and second electrode plates along the shape of the electrode.

2. The device of claim 1, wherein the second electrode layer is also a patterned electrode layer.

3. The device of claim 1, wherein the first patterned electrode layer comprises another electrode.

4. The device of claim 3, wherein the electrode and the other electrode are parallel to each other.

5. A device for transmitting light signals comprising:
a first electrode plate, comprising a first substrate and a first patterned electrode layer disposed on a surface of the first substrate;
a second electrode plate, comprising a second substrate and a second electrode layer disposed on a surface of the second substrate opposite the first patterned electrode layer;
a spacing structure, disposed between the first electrode plate and the second electrode plate;
a cladding fluid, disposed between the first electrode plate and the second electrode plate; and
a core fluid, disposed between the first electrode plate and the second electrode plate, surrounded by the cladding fluid, and located on an electrode of the first patterned electrode layer, wherein the core fluid has a shape corresponding to the shape of the electrode, and the core fluid has a higher refractive index than the cladding fluid;
wherein the first patterned electrode layer comprises another electrode, and the electrode and the other electrode each have a common portion and a separated portion.

6. The device of claim 3, wherein the second electrode layer is also a patterned electrode layer.

7. The device of claim 1, wherein the first electrode plate further has a hydrophobic layer disposed on the first patterned electrode layer.

8. The device of claim 7, wherein the first electrode plate further has a dielectric layer disposed between the hydrophobic layer and the first patterned electrode layer.

9. The device of claim 1, wherein the second electrode plate further has a hydrophobic layer disposed on the second electrode layer.

10. The device of claim 9, wherein the second electrode plate further has a dielectric layer disposed between the hydrophobic layer and the second electrode layer.

11. The device of claim 1, wherein the cladding fluid is silicone oil, mineral oil, aqueous solution, or gas.

12. The device of claim 1, wherein the core fluid is γ-butyrolactone, silicone oil, mineral oil, or aqueous solution.

13. The device of claim 1, wherein a dielectric constant of the core fluid is higher than that of the cladding fluid.

14. A method for transmitting light signals comprising:
disposing a cladding fluid and a core fluid between a first electrode plate and a second electrode plate, wherein the first electrode plate has a first patterned electrode layer, the second electrode plate has a second electrode layer, the refractive index of the core fluid is higher than of the cladding fluid;

applying an electric potential to an electrode of the first patterned electrode layer and the second electrode layer to cause the core fluid to change a shape thereof according to the shape of the electrode, wherein the shape-changed core fluid is surrounded by the cladding fluid; and coupling light signals into the shape-changed core fluid; the core fluid substantially bisecting the cladding fluid to guide the light signal between the first and second electrode plates along the shape of the electrode.

15. The method of claim 14, further comprising:
switching the electric potential to another electrode of the first patterned electrode layer and the second electrode layer, so as to cause the core fluid to move to the powered electrode and change a shape thereof according to the shape of the powered electrode.

16. The method of claim 15, wherein the core fluid partly moves to one of the electrodes.

17. The method of claim 15, wherein the core fluid entirely moves to one of the electrodes.

18. The method of claim 14, wherein the core fluid is manipulated through a physical phenomenon of electrowetting.

19. The method of claim 14, wherein the core fluid is manipulated through a physical phenomenon of dielectrophoresis.

* * * * *